UNITED STATES PATENT OFFICE 2,009,948

PRODUCTION OF UNSATURATED ALCOHOLS

Otto Schmidt and Karl Huttner, Ludwigshafen-on-the-Rhine, and Georg Kaeb, Rheingonheim, Germany, assignors to I. G. Farbenindustrie Aktiengesellschaft, Frankfort-on-the-Main, Germany No Drawing. Application July 30, 1932, Serial No. 627,100. In Germany August 27, 1931

7 Claims. (Cl. 260—156)

The present invention relates to the production of unsaturated alcohols.

In the reduction of unsaturated aliphatic or cycloaliphatic compounds, hydrogen usually adds on first at the multiple linkages, but also the catalytic hydrogenation of citronellal to citronellol is known in the art, which process has been carried out with the aid of a nickel catalyst according to the German Patent No. 540,327.

We have now found that valuable unsaturated alcohols can be obtained from unsaturated aliphatic, carbonyl compounds, i. e. aldehydes and ketones containing even more than 15 carbon atoms by acting on the latter with hydrogen in the presence of hydrogenation catalysts under mild reaction conditions.

The reaction may be carried out in the gaseous or liquid phase by catalytic methods, if desired in the presence of organic solvents, preferably with the employment of increased pressure. By the term mild conditions we wish to define that the known particularly efficient hydrogenation catalysts consisting for example of platinum, palladium, cobalt or nickel should, preferably, not be employed or, at the most, in a state of reduced activity as can be obtained in known manner by poisoning or partial inactivation, for example with the aid of organic sulphur compounds such as sulphurized quinoline. Mixtures of these metals with known weak hydrogenation catalysts, in which the said metals are not present in preponderating quantities may find useful application, however. Generally, weak hydrogenation catalysts, such as copper, zinc or cadmium may be employed as such or in mixture, or in the form of compounds thereof with acid compounds of the metals, the oxides of which are difficultly reducible by hydrogen, as for example zinc, copper or cadmium chromites or chromates, or manganates, manganites, molybdates, tungstates or uranates and mixtures of the aforesaid three or like metals with one or more oxides of the type of those of chromium, molybdenum, tungsten and uranium. These mixtures can be obtained by heating and reducing the said compounds whereby the latter are incompletely reduced, that is to say, copper and chromium oxides for example. These weak hydrogenation catalysts have been already used in the same way as the highly efficient, strong hydrogenation catalysts but they form apparently a specific group of the whole series of hydrogenation catalysts as they have been found highly efficient for the reduction of carbonyl groups but less active for saturating unsaturated linkages between carbon atoms. These catalysts, which are also often employed in the well known catalytic reduction of carbon oxides to methanol, may be therefore defined as hydrogenation catalysts favoring reduction of carbonyl groups.

The efficiency of the hydrogenation catalysts favoring reduction of carbonyl groups may be increased, without altering their specific effect, by adding one or more alkaline reacting compounds, such as oxides, hydroxides, phosphates, borates, molybdates or tungstates of the alkali or alkaline earth metals, that is of lithium, potassium, sodium, calcium, barium and strontium, including magnesium and aluminium; these activating additions may also react with the hydrogenation catalysts favoring reduction of carbonyl groups or constituents thereof, so that the final catalyst may comprise for example calcium zincate, zinc aluminate or copper manganite, and like compounds, in which at least one component is difficultly reducible by hydrogen.

By the term mild conditions we wish further to define that the substance to be reduced must not be exposed to the action of hydrogen and catalyst for a long time, if comparatively high temperatures of working be employed, such as from about 250° to about 400° C., the optimal velocity of the substances to be reduced depending of course on the initial material, the catalyst chosen, the quantity of hydrogen present and the pressure employed. Thus, for example, catalysts containing zinc or zinc compounds as the essential constituents are usually employed at higher temperatures than those containing copper or compounds thereof. Catalysts containing active copper or compounds thereof may be usefully employed on working in the liquid phase, at a pressure of about 40 atmospheres and at temperatures mainly below 200° C. without a hydrogenation of double linkages, whereas catalysts containing zinc or compounds thereof may be also employed at higher temperatures.

In most cases temperatures between about 50° and about 400° C., preferably between 50° and about 250° C. are employed, the pressure of hydrogen being preferably adjusted to from about 10 to about 200 atmospheres. The reaction starts, however, in many cases already at room temperature, heat being applied only for accelerating the reaction. Generally speaking on working in the liquid phase lower temperatures but higher pressures are used than on working in the gaseous phase. The liquid phase process may be carried out intermittently or continuously, the gaseous phase process being usually carried out in a continuous manner. Solvents suitable for employment in the process according to the present invention are for example the different liquid fractions of mineral oils, benzene or hexa-hydrobenzene or their homologues, decahydronaphthalene, or liquid alcohols of any kind, including cyclohexanol and its homologues.

According to this invention extremely valuable primary and secondary unsaturated alcohols can be obtained. For example oleyl alcohol may be prepared from oleic aldehyde, heptadecylenemethyl carbinol from heptadecylene methyl ketone, di-heptadecenyl carbinol from di-heptadecenyl ketone, heptadecenyl decenyl carbinol from heptadecenyl decenyl ketone, heptadecenyl propyl carbinol from heptadecenyl propyl ketone, phenyl-decenyl alcohol from phenyl-decenyl aldehyde, phenyl-decenyl ethyl carbinol from phenyl-decenyl ethyl ketone or heptadecenedienyl methyl carbinol from heptadecendienyl methyl ketone and the like.

The unsaturated alcohols of high molecular weight thus obtainable are excellent initial materials for the preparation of wetting, dispersing, washing and like agents and for the production of dyestuffs and pharmaceutical preparations. For example by splitting off water from heptadecylene methyl carbinol, nonadecadiene can be obtained which may serve as the initial material for the preparation of valuable hydroxy-sulphonic acids.

The following examples will further illustrate the nature of this invention but the invention is not restricted to these examples. The parts are by weight.

Example 1

1—M solutions of copper nitrate and of aluminium nitrate are mixed in the molecular ratio of 10 to 1, whereupon a mixture of the copper carbonate and aluminium hydroxide is precipitated by adding sodium carbonate at about 40° C. The precipitate is thoroughly washed with distilled water and then dried at 100° C. The mixture is then heated at about 300° C. for 24 hours in a current consisting at first of a mixture of about 70 per cent by volume of nitrogen and 30 per cent of hydrogen and afterwards in a current with increased content of hydrogen, the mixture being then allowed to cool in a current of carbon dioxide.

Heptadecenyl methyl ketone is mixed with 3 per cent by weight of the catalyst, and heated to 100° C. in a pressure-tight vessel at a hydrogen pressure of 50 atmospheres. After the absorption of hydrogen has ceased, the reaction product is freed from the catalyst. It is a colorless, pasty mass which consists of a mixture of heptadecenyl methyl carbinol and heptadecyl methyl carbinol and possesses a hydroxyl value of about 195 and an iodine value of about 50.

Example 2

A catalyst is prepared by saturating kieselguhr, pumice powder or other porous inert substances with a concentrated aqueous copper nitrate solution and then introducing the saturated mass into a dilute soda solution. The mass is thereupon filtered, washed with water and dried and treated with hydrogen in an inert diluent which is capable of dissolving oleic aldehyde, as for example benzene. 100 parts of oleic aldehyde and a quantity of the copper catalyst, corresponding to 1.3 parts of copper, are introduced into a pressure-tight vessel which is suitably provided with a copper lining. Thereupon hydrogen is pressed at about 50 atmospheres into the vessel and the latter is heated slowly to 100° C., while stirring. The absorption of the hydrogen begins already at 70° C. As soon as the quantity of hydrogen necessary for the reduction of oleic aldehyde to oleyl alcohol is consumed, no further absorption of hydrogen occurs. The liquid obtained is filtered off from the catalysts; oleyl alcohol, with an iodine number of about equal value as that of the aldehyde employed, is obtained in a good yield.

The reduction of the oleic aldehyde to oleyl alcohol takes place also at a relatively low pressure of hydrogen (about 20 atmospheres); even at 100 atmospheres no hydrogenation of the double linkage occurs.

Example 3

3 parts of basic zinc chromate, obtained by adding an aqueous solution of 0.5 molecular proportion of ammonium bichromate to an aqueous solution of 1 molecular proportion of zinc nitrate and adding a quantity of ammonia sufficient for complete precipitation, are added to 100 parts of crude heptadecenyl methyl ketone. The mixture is then passed into a pressure-tight vessel and heated therein to 250° C. while introducing hydrogen and keeping the pressure at about 100 atmospheres. A soft product is obtained which shows a hydroxyl value of 160, an iodine value of about 50 and contains heptadecyl methyl carbinol together with the unsaturated alcohol heptadecenyl methyl carbinol.

Example 4

An aqueous solution of 0.5 molecular proportion of ammonium bichromate is mixed while warming with an aqueous solution of 1 molecular proportion of copper nitrate, whereupon the precipitation of the resulting precipitate is completed by adding ammonia. After washing with water and drying at 100° C., the copper chromate obtained is moderately heated until it is dark black. 2.5 parts of the product are added to 100 parts of heptadecenyl methyl ketone, whereupon the mixture is heated in an autoclave to 150° C. while introducing hydrogen and keeping the pressure at 100 atmospheres until the consumption of hydrogen has ceased. After the reaction, the product is separated from the catalyst by filtration. A yellowish oil is obtained which resembles the initial ketone but shows a hydroxyl value of 188 and an iodine value of 65 in contrast to an iodine value of the initial material of 85. The theoretical hydroxyl value of heptadecenyl methyl carbinol is 200.

Example 5

By adding a saturated aqueous solution of sodium bicarbonate at about 40° C. to an aqueous solution of 1 molecular proportion of copper nitrate and 2 molecular proportions of manganese nitrate in such a quantity that 1 molecular proportion of metal salt is present in 1 liter of the solution the metal carbonates are precipitated, whereupon the precipitate is carefully washed, dried and then heated to 400° C. for 1 hour. 3 parts of the catalyst prepared in this manner are added to 100 parts of crude heptadecenyl methyl ketone, whereupon the whole is heated in a pressure-tight vessel to 150° C. while introducing hydrogen and keeping thereby the pressure at 100 atmospheres until the consumption of hydrogen has ceased. The reaction product is a pale thinly viscous liquid, and shows an iodine value of 76 and a hydroxyl value of about 170 corresponding to the reduction of the main portion of the ketone to the corresponding carbinol.

*Example 6*

2 volumes of a 1—M aqueous solution of zinc nitrate are mixed with 1 volume of a 1—M aqueous solution of copper nitrate, whereupon a mixture of the metal carbonates is precipitated by adding, at about 40° C., a saturated aqueous solution of sodium bicarbonate, whereupon the mixture of metal carbonates is dried and heated for a few hours to about 400° C. 3 parts of the catalyst prepared in this manner are added to 100 parts of crude heptadecenyl methyl ketone, whereupon the whole is heated in a pressure-tight vessel to 150° C. while adding hydrogen and keeping the pressure at 100 atmospheres until the consumption of hydrogen has ceased. A thinly liquid reaction product is obtained which shows a hydroxyl value of about 185 and an iodine value of about 70. The product consists mainly of heptadecenyl methyl carbinol in mixture with a little heptadecyl methyl carbinol.

*Example 7*

300 parts of the compound obtained by decomposing copper chromate by heating, washing with aqueous acetic acid and drying at from 100° to 110° C. are mixed with 1260 parts of benzene, whereupon the whole is heated in a pressure-tight vessel, which is preferably lined with copper and has an internal space of from about 5 to 10 times the volume of the benzene employed, to 150° C. while introducing hydrogen at a pressure of 100 atmospheres. After the reduction is completed the vessel is cooled and about 2300 parts of oleic aldehyde are added and the pressure is raised again to 100 atmospheres by introducing hydrogen. While warming, the pressure decreases, the decrease of pressure ceasing at about 80° C. The reaction product is separated from the catalyst by filtration and can be purified by distillation in vacuo or by bleaching. The oleyl alcohol obtained in an almost quantitative yield is completely free from initial aldehyde and shows, after distillation in vacuo, a pale color, an iodine value of 89 and a hydroxyl value of 205.

What we claim is:—

1. The process for the production of unsaturated alcohols which comprises heating an aliphatic unsaturated carbonyl compound containing more than 15 carbon atoms selected from the group consisting of aldehydes and ketones with hydrogen to a temperature between about 50° and about 250° C. and at a pressure between about 10 and about 200 atmospheres in the presence of a weak hydrogenation catalyst comprising essentially at least one substance asssisting hydrogenation and selected from the group consisting of copper, zinc and cadmium and in completely reducible compounds thereof.

2. The process for the production of unsaturated alcohols which comprises heating an aliphatic unsaturated ketone containing more than 15 carbon atoms with hydrogen to a temperature between about 50° and about 250° C. and at a pressure between about 10 and about 200 atmospheres in the presence of a weak hydrogenation catalyst comprising essentially at least one substance assisting hydrogenation and selected from the group consisting of copper, zinc and cadmium and incompletely reducible compounds thereof.

3. The process for the production of unsaturated alcohols which comprises heating an aliphatic unsaturated ketone containing more than 15 carbon atoms with hydrogen to a temperature between about 50° and about 250° C. and at a pressure between about 10 and about 200 atmospheres in the presence of a weak hydrogenation catalyst comprising essentially at least one substance assisting hydrogenation and selected from the group consisting of copper and incompletely reducible compounds thereof.

4. The process for the production of unsaturated alcohols which comprises heating an aliphatic unsaturated aldehyde containing more than 15 carbon atoms with hydrogen to a temperature between about 50° and about 250° C. and at a pressure between about 10 and about 200 atmospheres in the presence of a weak hydrogenation catalyst comprising essentially at least one substance assisting hydrogenation and selected from the group consisting a copper zinc and cadmium and incompletely reducible compounds thereof.

5. The process for the production of heptadecenyl methyl carbinol which comprises heating heptadecenyl methyl ketone with hydrogen to from about 100° to about 150° C. and at a pressure of about 50 atmospheres in the presence of a weak hydrogenation catalyst comprising essentially at least one substance assisting hydrogenation and selected from the group consisting of copper and incompletely reducible compounds thereof.

6. The process for the production of oleyl alcohol which comprises heating oleic aldehyde with hydrogen at a pressure of from about 50 to about 100 atmospheres in the presence of a weak hydrogenation catalyst comprising essentially at least one substance assisting hydrogenation and selected from the group consisting of copper and incompletely reducible compounds thereof.

7. Heptadecenyl methyl carbinol.

OTTO SCHMIDT.
KARL HUTTNER.
GEORG KAEB.